May 14, 1940.  M. FLEISCHER ET AL  2,200,953
MOTION PICTURE APPARATUS
Filed April 5, 1937    2 Sheets-Sheet 1
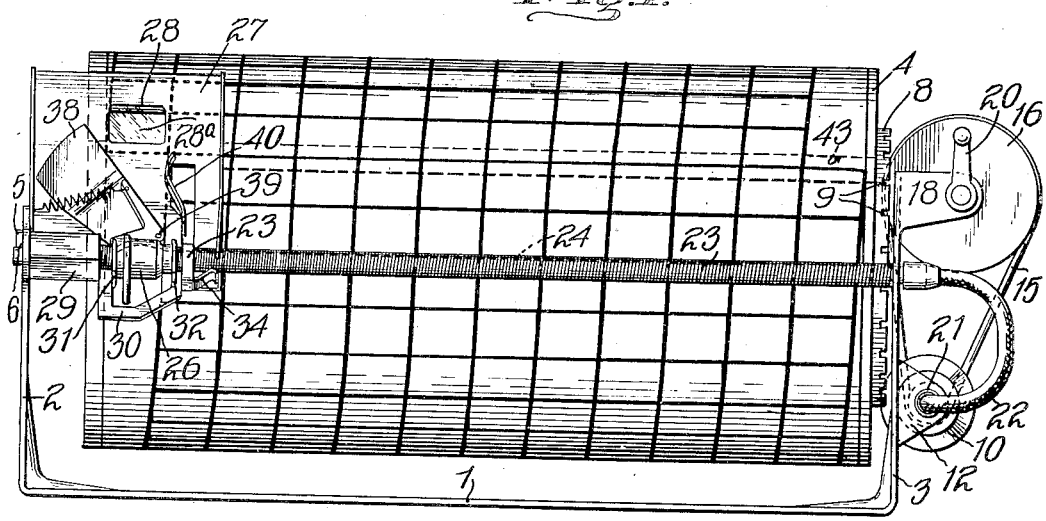
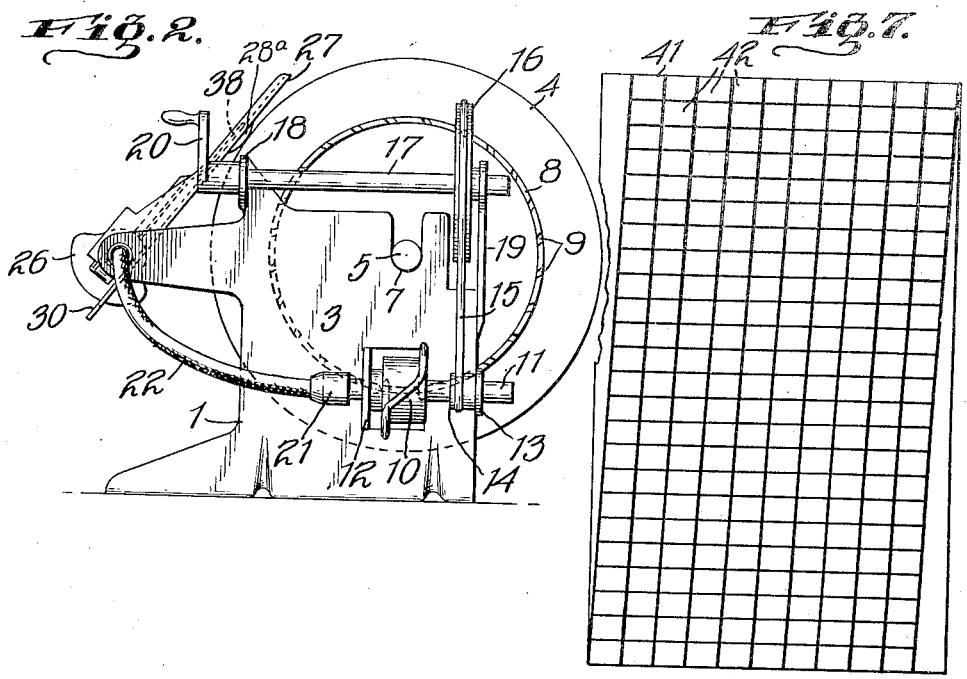
INVENTORS
MAX FLEISCHER
JOHN E. BURKS
BY
Hornidge and Dowd
ATTORNEYS May 14, 1940.　　M. FLEISCHER ET AL　　2,200,953
MOTION PICTURE APPARATUS
Filed April 5, 1937　　2 Sheets-Sheet 2
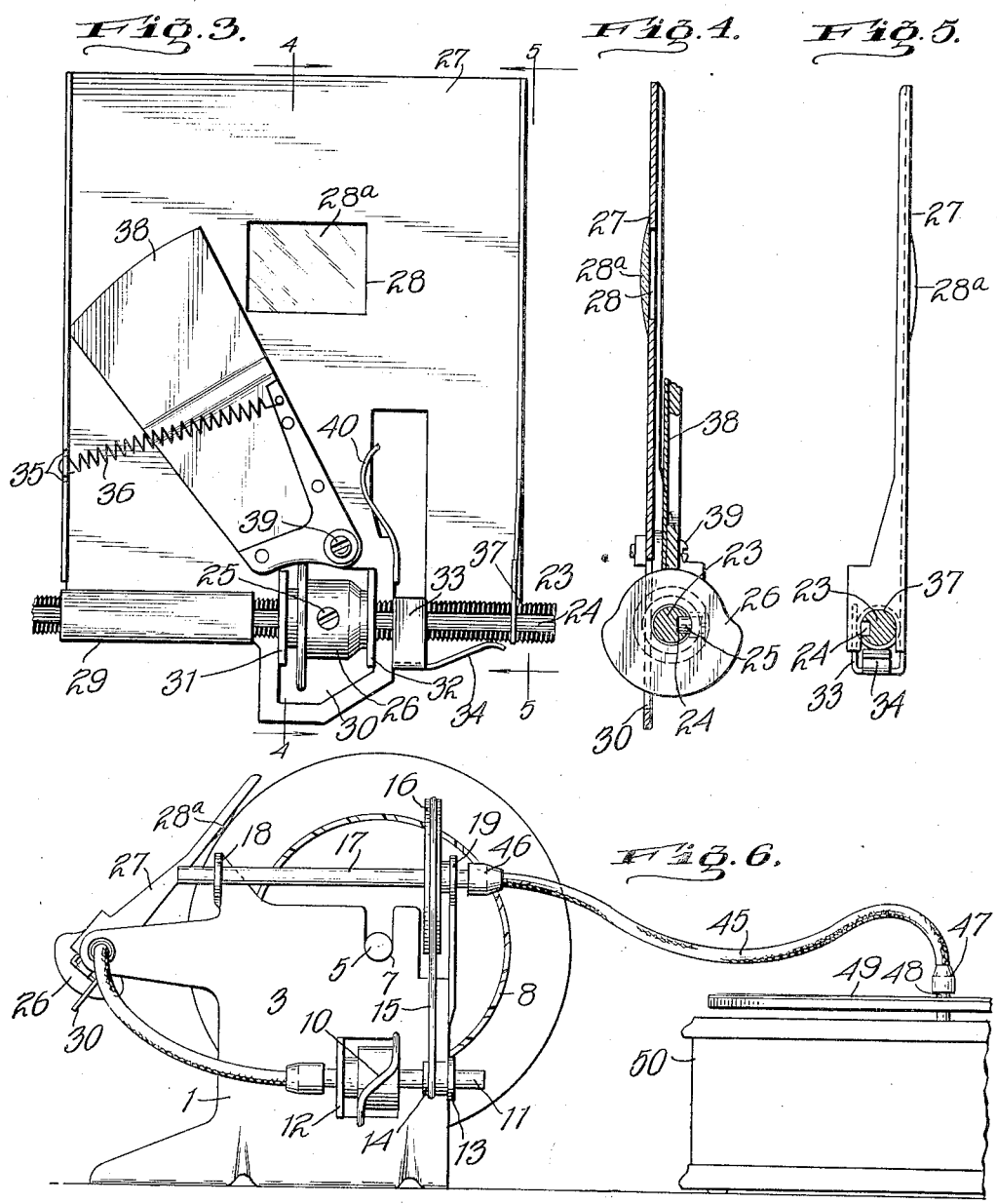
INVENTORS
MAX FLEISCHER
JOHN E. BURKS
BY
Harridge and Dowd
ATTORNEYS Patented May 14, 1940

2,200,953

UNITED STATES PATENT OFFICE 2,200,953

MOTION PICTURE APPARATUS

Max Fleischer, New York, and John E. Burks, Great Neck, N. Y.; said Burks assignor to said Fleischer Application April 5, 1937, Serial No. 134,988

3 Claims. (Cl. 88—16)

This invention relates to a motion picture machine in which the pictures to be viewed successively are disposed in oblique columns upon a single sheet which may be readily wrapped about the surface of a cylindrical drum, and when so mounted upon the drum with the upper and lower edges of the sheet abutting each other the sequence of pictures will be in the form of a continuous spiral about the drum, with the result that as the drum is intermittently rotated the pictures composing the sequence are viewed successively while the attention of the observer is carried in an easy and continuous direction across the face of the drum.

The arrangement of the pictures in this way renders them particularly suitable for publication in a newspaper. A large number of newspapers today contain what are known as "comic strips," often occupying an entire page, which usually comprise a number of drawings depicting a series of events going to make up a story. In accordance with the present invention such a newspaper page may have printed upon it a large number of small drawings of characters or objects in progressive stages of animation which may be readily mounted on such a machine and enjoyed as a motion picture. A newspaper page of the usual size may contain a sufficient number of pictures to provide a motion picture which will last for the period of a minute when shown at the speed of sixteen pictures per second. Sheets containing such drawings or reproductions of photographs made in the usual way with a motion picture camera may be also published and distributed, for instance, in the form of single sheets or detachable pages in a book, and when taken in connection with this viewing machine would constitute a valuable form of advertising.

It is an object of my invention to provide a simple and inexpensive machine whereby a sequence of pictures in this form may be effectively shown as a motion picture and which may be driven by hand or easily coupled to a phonograph turntable as a prime mover.

Other objects and advantages of the invention will be apparent from the following description of it taken in connection with the attached drawings in which:

Fig. 1 is a front elevation of the machine showing the pictures mounted thereon.

Fig. 2 is an end view of same.

Fig. 3 is a detail view of the viewing aperture and shutter and of the means for operating them.

Fig. 4 is a view on the line 4—4 of Fig. 3.

Fig. 5 is a view on the line 5—5 of Fig. 4.

Fig. 6 is a view of the machine coupled to a phonograph as a prime mover.

Fig. 7 is a plan view of a sheet showing the arrangement of the pictures in accordance with the invention.

Referring to the drawings, 1 is a base having two upright end plates 2 and 3 which support the rotatable cylindrical drum 4 and its operating mechanism. Said drum 4 is made preferably of light material such as cardboard for its face and sheet metal for its ends and is mounted on the shaft 5 which is journaled in the end plates as at 6 and 7, in open bearings to permit its easy removal or substitution for another drum.

Concentrically mounted on one end of the drum is the ring 8 provided with a plurality of equally spaced slots 9 adapted to receive the helical cam 10 attached to the shaft 11 which is journaled in the brackets 12 and 13 projecting from the end plate 3. The number of said slots 9 is equal to the number of pictures disposed in a column having a length equal to the circumference of the drum. Also attached to said shaft 11 is a sprocket 14 connected by the chain 15 to a larger sprocket 16 which is mounted on the shaft 17. A convenient ratio for said sprockets is about one to twelve and one half. Said shaft 17 is journaled in the projecting brackets 18 and 19 and is provided at its front end with the hand-crank 20.

The design of that part of the said helical cam 10 which engages the slots 9 is as follows: From its beginning it extends circumferentially in a straight direction a distance of about 95 degrees whereupon it is inclined laterally in a sine curve for a distance of 180 degree where it again assumes a straightaway direction for a distance of about 95 degrees, the lateral distance between the two straightaway portions being equal to the distance between two of the slots 9. Thus it will be seen that for the period of each revolution of the cam 10 the drum 4 wil be rotated during half of such period for the extent of the distance between two of the slots 9 and remain at rest during the other half of such period, the overlapping of the parallel beginning and end portions of the helical cam 10 serving to cause one end of the cam to enter the succeeding adjacent slot of the ring 8 before the cam has passed out of engagement with the first slot, thus preserving a continuous engagement of the helical cam with the slots in the ring 8 and giving a high degree of smoothness to the intermittent rotation of the drum 4.

Connected at one end to the front end of the shaft 11 by the friction socket 21 is the flexible shaft 22 the other end of which is connected in a similar way to the horizontal threaded shaft 23 which is journaled at each end in forwardly projecting portions of the end plates 2 and 3. Said threaded shaft 23 is formed with a channel 24 extending along its length to receive the end of the set screw 25 in the eccentric cam 26 which is slidably mounted on the threaded shaft 23 and is thus rotated by said shaft.

27 is a plate made preferably of thin sheet metal having therein a rectangular aperture 28 conforming substantially to the size and shape of the individual pictures on the drum 4 and fitted with a magnifying lens 28a. Adjacent its lower edge said plate 27 for a distance of less than one-half its width is bent around in the form of a tube 29 in which the shaft 23 may freely rotate, and a downwardly extending cut out portion 30 of the plate 27 formed with outwardly bent flanges 31 and 32 provides a space for the rotation of the cam 26 and at the same time prevents any lateral movement of said cam with relation to said plate. A further portion 33 of said plate 27 is bent around the shaft 23 to form a seat to which is attached one end of the flat spring 34 the other end of which presses upwardly against the shaft 23.

The sides of the plate 27 have bent over portions, one provided with holes 35 through which the spring 36 may be attached, and the other formed with a semi-circular slot 37 the inner edges of which are adapted to engage the threads of the shaft 23, being held thereto by the pressure of the spring 34.

38 is a shutter pivotally mounted on the plate 27 as at 39, and actuated by the eccentric cam 26 and the tension spring 36 to close and open the aperture 28 with each revolution of the shaft 23. The cam is so formed that the shutter 38 is rapidly closed and remains so during one half revolution of the shaft 23 and is open during the next half revolution of said draft. 40 is an upright flat spring to cushion the impact of the shutter in the closing operation.

Referring to Fig. 7, 41 is a rectangular sheet having a length equal to the circumference of the drum 4 and a width substantially equal to the length of said drum. Said sheet is made preferably of paper and contains on its surface a plurality of pictures 42 of equal size and shape conforming in height to that of the aperture 28. Said pictures are arranged in oblique columns extending from top to bottom of the sheet, each column containing the same number of pictures as the number of slots 9 in the ring 8. The sequence of the pictures to give the effect of animation is from the bottom to the top of each column in succession towards the right.

The top and bottom edges of the said pictures 42 are at right angles to the side edges of the sheet 41 while their side edges are obliquely disposed with respect to their top and bottom edges and each of the said pictures in each column is displaced laterally of its preceding picture a distance equal to the width of the column including the marginal portion thereof as measured along the top or bottom of a picture, divided by the said number of pictures in the column, with the side edges of said pictures in alignment. Thus when said sheet 41 is wrapped around the face of the drum 4 with its top and bottom edges abutting each other the successive columns of pictures will form a continuous spiral around said drum.

Said sheet 41 may be attached to said drum 4 in any convenient way, such as by circular rubber bands or preferably by a strip of dry adhesive tape such as 43 attached to the drum with its adhesive side outwards and of sufficient width to receive and hold the top and bottom edges of the sheet 41 which may be pressed down upon it, and from which it may be easily detached when it is desired to substitute another such sheet of pictures.

The operation of the machine is as follows: With the sheet 41 of pictures in place upon the drum 4, and the first of the sequence of said pictures 42 at the level of the aperture 28, the plate, with the shutter 38 in its open position, is disengaged from the threaded shaft 23 by a slight upward tilt against the pressure of the spring 34 and moved to a position where the aperture 28 is in register with said picture on the drum, where it is allowed to engage again with the threaded shaft 23. By turning the crank handle 20 to the right at a speed to produce about 16 revolutions of the cam 10 per second, each of the pictures 42 is successively brought down to the level of the aperture 28 where it remains at rest for half that period with the shutter 38 in the open position, after which the shutter is closed by the cam 26 and at the same time the next picture is brought down to rest in a similar way behind the aperture 28 with the shutter 38 again opened.

The pitch of the threads on the shaft 23 is such that with each revolution of said shaft the plate 27 carrying with it the shutter 38 and its actuating cam 26 is moved laterally a distance equal to the aforesaid lateral displacement of each picture, and while such lateral movement is continuous and persists during the period when the drum 4 is at rest, nevertheless the extent of such movement is so slight and gradual as to be scarcely noticeable.

Thus with the continued turning of the crank 20 each of the entire sequence of pictures is brought successively before the aperture 28 and the enjoyable effect of a motion picture is produced upon the operator viewing them through the lens 28a.

Fig. 6 shows an arrangement whereby the shaft 17 is connnected by means of a flexible shaft 45 and two friction sockets 46 and 47 at the ends thereof to the upper end of the vertical shaft 48 of the turntable 49 of a disc phonograph 50. Since the turntable of an ordinary disc phonograph is designed to rotate at a constant speed of about 76 revolutions per minute, it will drive the helical cam at substantially the same proper speed as by the use of the hand crank. With a phonograph thus used for motive power it may also be used to play a record of accompanying music, or a record containing appropriate dialogue for the sheet of pictures may be provided, and played upon the phonograph in synchronism with the movement of the pictures, thus giving the advantages of talking pictures.

What we claim is:

1. In a machine of the class described, a rotatable drum adapted to support a plurality of pictures arranged in a spiral about the face of said drum, a threaded shaft disposed parallel to the axis of said drum, an aperture plate mounted on said shaft with an edge of said aperture plate resiliently held in engagement with the thread of said shaft, and means for intermittently rotating said drum and rotating said threaded shaft.

2. In a machine of the class described a rotatable drum adapted to support a plurality of pictures arranged in a spiral about the face of said drum, a threaded shaft disposed parallel to the axis of said drum, an aperture plate mounted on said shaft with the edge of a turned over portion of said aperture plate resiliently held in engagement with the thread of said shaft, and means for intermittently rotating said drum and rotating said threaded shaft.

3. In a machine of the class described, a rotatable drum adapted to support a plurality of pictures arranged in a spiral about the face of said drum, a ring concentrically mounted at one end of said drum and formed with a plurality of equally spaced slots, a helical cam adapted to engage said slots in succession, a threaded shaft disposed parallel to the axis of said drum, an aperture plate mounted on said shaft and engaging the threads thereof, a cam slidably mounted on and rotated by said shaft, a reciprocating shutter for said aperture operated by said cam, and means for rotating said helical cam and said threaded shaft.

MAX FLEISCHER.
JOHN E. BURKS.